US009723481B2

(12) United States Patent
Schell et al.

(10) Patent No.: US 9,723,481 B2
(45) Date of Patent: Aug. 1, 2017

(54) ACCESS DATA PROVISIONING APPARATUS AND METHODS (75) Inventors: Stephan V. Schell, Cupertino, CA (US); David Haggerty, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/078,811

(22) Filed: Apr. 1, 2011

(65) Prior Publication Data
US 2012/0108295 A1    May 3, 2012

Related U.S. Application Data (60) Provisional application No. 61/408,504, filed on Oct. 29, 2010.

(51) Int. Cl.
*H04Q 7/10* (2006.01)
*H04W 8/26* (2009.01)
(Continued)

(52) U.S. Cl.
CPC ........... *H04W 8/265* (2013.01); *H04W 4/001* (2013.01); *H04W 4/003* (2013.01); *H04W 12/04* (2013.01)

(58) Field of Classification Search
CPC ..... H04W 4/001; H04W 24/02; H04W 4/003; H04W 74/006; H04W 8/265; H04W 12/02
(Continued)

(56) References Cited

U.S. PATENT DOCUMENTS 6,799,155 B1 * 9/2004 Lindemann et al. ............ 703/24
8,107,937 B2 * 1/2012 Jokinen et al. ................ 455/418
(Continued)

FOREIGN PATENT DOCUMENTS

EP    2076071    7/2009
EP    2079256    7/2009
(Continued)

OTHER PUBLICATIONS

Taiwanese Patent Application No. 100138903—Office Action dated Mar. 7, 2014.
(Continued)

*Primary Examiner* — Ajit Patel
*Assistant Examiner* — Julio Perez
(74) *Attorney, Agent, or Firm* — Downey Brand LLP (57) ABSTRACT Methods and apparatus for activating a purchased or previously deployed device by a subscriber. In one embodiment, activation includes authenticating the device to a service provider or carrier, and providing the device with data necessary for enabling the service to the device. In one variant, a user device is activated at a retail store, with the assistance of a carrier representative. In another variant, user equipment is activated via a communications network without the assistance of a representative. In yet another variant, the user equipment is activated via the Internet without the assistance of a representative. The provision of access data includes pre-assigning eSIM from a population of unassigned eSIMs to certain devices for various carrier networks. Alternatively, the eSIM may be assigned on an as-needed basis. Unassigned and/or unused eSIMs can be released (or sold back to the vendor) and/or reused. Solutions for eSIM backup and restoration are also described.

20 Claims, 6 Drawing Sheets (51) Int. Cl.
*H04W 4/00* (2009.01)
*H04W 12/04* (2009.01)

(58) Field of Classification Search
USPC .................. 455/411, 436, 538, 558, 551
See application file for complete search history.

(56) References Cited

U.S. PATENT DOCUMENTS

| | | | |
|---|---|---|---|
| 2004/0176134 A1* | 9/2004 | Goldthwaite et al. | 455/558 |
| 2005/0176465 A1* | 8/2005 | Fornell | 455/558 |
| 2007/0167161 A1* | 7/2007 | Cheng et al. | 455/435.1 |
| 2008/0132205 A1* | 6/2008 | Svensson | 455/411 |
| 2008/0260149 A1 | 10/2008 | Gehrmann | |
| 2008/0261561 A1 | 10/2008 | Gehrmann | |
| 2009/0077643 A1 | 3/2009 | Schmidt | |
| 2009/0181662 A1 | 7/2009 | Fleischman | |
| 2009/0205028 A1 | 8/2009 | Smeets | |
| 2010/0009696 A1 | 1/2010 | Fok et al. | |
| 2011/0269423 A1 | 11/2011 | Schell | |
| 2011/0306318 A1 | 12/2011 | Rodgers | |
| 2012/0047227 A1 | 2/2012 | Haggerty | |
| 2012/0108204 A1 | 5/2012 | Schell | |
| 2012/0108205 A1 | 5/2012 | Schell | |
| 2012/0108206 A1 | 5/2012 | Haggerty | |
| 2012/0108207 A1 | 5/2012 | Schell | |
| 2012/0115441 A1 | 5/2012 | Schell | |
| 2012/0117635 A1 | 5/2012 | Schell | |
| 2012/0129513 A1* | 5/2012 | van der Laak | 455/419 |
| 2012/0135710 A1 | 5/2012 | Schell | |
| 2012/0196569 A1* | 8/2012 | Holtmanns et al. | 455/411 |
| 2015/0017910 A1* | 1/2015 | Li et al. | 455/41.1 |

FOREIGN PATENT DOCUMENTS

| | | |
|---|---|---|
| EP | 2410777 | 1/2012 |
| JP | 2010532107 | 9/2010 |
| TW | 201008331 | 2/2010 |
| WO | WO2010006305 | 1/2010 |

OTHER PUBLICATIONS

Korean Patent Application No. 10-2014-106320—Office Action dated Apr. 10, 2015.

* cited by examiner

FIG. 6

ACCESS DATA PROVISIONING APPARATUS AND METHODS

PRIORITY AND RELATED APPLICATIONS

This application claims priority to U.S. Provisional Patent Application Ser. No. 61/408,504 filed on Oct. 29, 2010 and entitled "ACCESS DATA PROVISIONING SERVICE", the foregoing being incorporated herein by reference in its entirety.

This application is also related to co-owned, co-pending U.S. patent application Ser. No. 12/952,082 filed on Nov. 22, 2010 and entitled "WIRELESS NETWORK AUTHENTICATION APPARATUS AND METHODS", Ser. No. 12/952,089 filed on Nov. 22, 2010 and entitled "APPARATUS AND METHODS FOR PROVISIONING SUBSCRIBER IDENTITY DATA IN A WIRELESS NETWORK", Ser. No. 12/980,232 filed on Dec. 28, 2010 and entitled "VIRTUAL SUBSCRIBER IDENTITY MODULE DISTRIBUTION SYSTEM", and Ser. No. 12/353,227 filed on Jan. 13, 2009, and entitled "POSTPONED CARRIER CONFIGURATION", and U.S. Provisional Patent Application Ser. Nos. 61/407,858 filed on Oct. 28, 2010 and entitled "METHODS AND APPARATUS FOR ACCESS CONTROL CLIENT ASSISTED ROAMING", 61/407,861 filed on Oct. 28, 2010 and entitled "MANAGEMENT SYSTEMS FOR MULTIPLE ACCESS CONTROL ENTITIES", 61/407,862 filed on Oct. 28, 2010 and entitled "METHODS AND APPARATUS FOR DELIVERING ELECTRONIC IDENTIFICATION COMPONENTS OVER A WIRELESS NETWORK", 61/407,866 filed on Oct. 28, 2010 and entitled "METHODS AND APPARATUS FOR STORAGE AND EXECUTION OF ACCESS CONTROL CLIENTS", 61/409,891 filed on Nov. 3, 2010 and entitled "METHODS AND APPARATUS FOR ACCESS DATA RECOVERY FROM A MALFUNCTIONING DEVICE", 61/410,298 filed on Nov. 4, 2010 and entitled "SIMULACRUM OF PHYSICAL SECURITY DEVICE AND METHODS", and 61/413,317 filed on Nov. 12, 2010 and entitled "APPARATUS AND METHODS FOR RECORDATION OF DEVICE HISTORY ACROSS MULTIPLE SOFTWARE EMULATION", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of communications systems, and more particularly in one exemplary aspect to wireless apparatus and methods that allow user equipment to authenticate to wireless networks (e.g., cellular networks, WLANs, WMANs, etc.) using access control clients.

2. Description of Related Technology

Access control is required for secure communication in most prior art wireless radio communication systems. As an example, one simple access control scheme might comprise: (i) verifying the identity of a communicating party, and (ii) granting a level of access commensurate with the verified identity. Within the context of a typical wireless system (e.g., a cellular system such as the well known Universal Mobile Telecommunications System (UMTS)), access control is governed by an access control entity or client, referred to as a Universal Subscriber Identity Module (USIM) (or more generally referred to as a "SIM"), executing on a physical Universal Integrated Circuit Card (UICC). The USIM authenticates the subscriber to the UMTS cellular network. After successful authentication, the subscriber is allowed access to the cellular network.

When a SIM card is manufactured, the SIM card is programmed with carrier-specific authentication information that restricts the use of that SIM card to a particular carrier. If a user wishes to change services from the existing carrier to a new carrier, the user needs to replace their SIM card with a new SIM card programmed in a similar way, but for the different carrier.

However, existing SIM solutions have multiple weaknesses and shortcomings. For example, the SIM software is hard-coded to the physical SIM card media; consequently, subscribers need new SIM cards to change SIM operation (and thereby change carriers). In short, the SIM card ties the user account to the carrier network, and not the mobile device itself.

For example, when a subscriber travels to a new service area, the subscriber must often choose between paying high roaming fees, or purchasing a new SIM card. Similarly, for users that change between billing accounts (e.g., sharing a phone for work and personal use, etc.), the user must constantly switch between SIM cards. Some devices have attempted to address this issue by providing multiple card receptacles, so as to enable multiple SIM cards. However, these "multi-card" solutions are undesirable, as additional SIM card receptacles take significant area, and do not address the root inflexibility, of SIM card accounts.

Moreover, as described in greater detail hereinafter, prior art solutions that tie a user account to a network with a SIM card are inadequate for some distribution schemes. For example, prior art distribution schemes cannot assign a SIM to a device without a user account. Similarly, once a SIM card is assigned to a user account and a network, that relationship is permanent. This effectively "locks" a user to a network, which limits user flexibility.

Thus, improved solutions are required for providing user with ability to obtain (e.g., purchase) and manage user accounts. Such improved solutions should ideally support delivery of a new or different user account to a device throughout its lifecycle (e.g., at manufacture, at sale, after deployment, etc.), without also requiring a new SIM card.

SUMMARY OF THE INVENTION

The present invention addresses the foregoing needs by providing, inter cilia, apparatus and methods for user equipment to authenticate to wireless networks (e.g., cellular networks, WLANs, WMANs. etc.) using access control clients.

In a first aspect of the invention, a method for provisioning user access data is disclosed. In one embodiment, the method comprises: responsive to receiving a request to provision one or more user access data for a device, verifying the device; allocating the one or more user access data; and programming the device with the one or more user access data, wherein the programmed user access data enables the device to receive services from a network.

In a second aspect of the invention, a network provisioning apparatus (e.g., SIM provisioning server (SPS)) is disclosed.

In a third aspect of the invention, a user device enabled for access client (e.g., eSIM) use and provisioning is disclosed. In one embodiment, the device comprises a mobile smartphone having at least one wireless interface.

In a fourth aspect of the invention, a device provisioning architecture is disclosed.

In a fifth aspect of the invention, a mobile communication system is disclosed.

In a sixth aspect of the invention, a virtual "storefront" entity for activating and provisioning mobile devices is disclosed.

In a seventh aspect of the invention, methods for assigning a mobile device an access client (e.g., electronic SIM) are disclosed.

In an eighth aspect of the invention, methods of operating a provisioning network are disclosed.

In a tenth aspect of the invention, methods of doing business within a wireless device provisioning architecture are disclosed.

In an eleventh aspect of the invention, methods of providing secure access client (e.g., eSIM) provisioning and activation are disclosed.

Other features and advantages of the present invention will immediately be recognized by persons of ordinary skill in the art with reference to the attached drawings and detailed description of exemplary embodiments as given below.

BRIEF DESCRIPTION OF THE DRAWINGS

All Figures © Copyright 2010 Apple Inc. All rights reserved.

DETAILED DESCRIPTION OF THE INVENTION

Reference is now made to the drawings wherein like numerals refer to like parts throughout.

Overview

The present invention discloses, inter alia, methods and apparatus for provisioning access data to a user device in a communications network in order to activate the user device. Activation of the device may first require authentication of the device to the particular carrier which will provide service to it, prior to the distribution of access data thereto. For example, in one embodiment described in greater detail hereinafter, a SIM (Subscriber Identity Module) provisioning server (SPS) can provision an electronic SIM (eSIM) to a mobile device for a particular carrier network (or even multiple networks).

In one such embodiment, a device is manufactured and boxed for delivery. The box is further printed or fitted with a label, where the label identifies a previously assigned eSIM (or the right to a future eSIM assignment) associated with the device. A new subscriber purchases the device, and using the label, activates the device with the assigned eSIM. Devices can advantageously be manufactured as so-called "SIM-in" devices, without actually including a physical SIM (e.g., card).

In another implementation, user equipment is purchased and activated in a retail store with the assistance of a mobile network operator (MNO) representative. The user may purchase a device (such as a mobile phone), at a retail store associated with a particular MNO or carrier, or via an OEM source enabled to provide provisioning services. The representatives at the store either, via the purchased device or an in-store so called "trusted" device, activate the device by requesting and receiving access data.

In yet another embodiment, the user may activate the purchased device himself or herself via the communications network, and without the assistance of an MNO or other representative. According to this embodiment, the user purchases the device either from the device manufacturer (such as at a retail store associated with or authorized by the device manufacturer), from the Internet, or from another party (such as an individual sale). In one variant, the device is pre-configured to access an available network for the sole purpose of enabling the device to select and communicate with an MNO and/or other entities for the activation process (e.g., authentication and access data delivery). In some implementations, the device is internally hardcoded with an identifier that identifies a previously assigned access data (or the right to a future access data assignment) associated with the device. Alternatively, the device is affixed with a printed label or other mechanism for conveying information that identifies a previously assigned access data.

In still another variant, the user equipment (not purchased at a carrier-managed store) is activated via the Internet and without the assistance of an MNO representative. According to this variant, the device is pre-configured to access the Internet, yet perform no other functions until activation is completed. It is via the Internet that the device may be authenticated to an MNO (or other entity) and request and receive access data. For instance, a user that purchases a mobile device can, remotely activate the mobile device with an SPS from the comfort of their own home.

In yet another aspect, each device is, prior to delivery to a user, linked to one or more MNOs. The MNO can pre-establish a device profile including a device identifier which is used in the authentication process. Access data, including e.g., eSIM, may be pre-personalized for each device such that a single device may have multiple available eSIM, each linked to a different MNO. These pre-personalized eSIM may also later be reclaimed and recycled to a pool of available eSIM. For example, a printed label or the like may come "primed" with three eSIMs for three different networks; after the mobile device purchaser selects one network, the label is disassociated with the non-selected networks, and the other two eSIMs are returned unused. Alternatively, the eSIMs can be retained by the user/device (whether for a period of time, or indefinitely) so as to provide the option of subsequent change to another MNO's network.

Methods and apparatus are also provided herein for the secure transfer of the aforementioned authentication and access data.

DETAILED DESCRIPTION OF EXEMPLARY EMBODIMENTS

Exemplary embodiments and aspects of the present invention are now described in detail. While these embodiments and aspects are primarily discussed in the context of Subscriber Identity Modules (SIMs) of a GSM, GPRS/EDGE, or UMTS cellular network, it will be recognized by those of ordinary skill that the present invention is not so limited. In fact, the various aspects of the invention are useful in any wireless network (whether cellular or otherwise) that can benefit from the provisioning and use of multiple access control entities or clients.

It will also be recognized that while the term "subscriber identity module" is used herein (e.g., eSIM), this term in no way necessarily connotes or requires either (i) use by a subscriber per se (i.e., the invention may be practiced by a subscriber or non-subscriber); (ii) identity of a single individual (i.e., the invention may be practiced on behalf of a group of individuals such as a family, or intangible or fictitious entity such as an enterprise); or (iii) any tangible "module" equipment or hardware.

Prior Art Subscriber Identity Module (SIM) Operation

Within the context of the exemplary prior art UMTS cellular network, user equipment (UE) includes a mobile device and a Universal Subscriber Identity Module (USIM). The USIM is a logical software entity that is stored and executed from a physical Universal Integrated Circuit Card (UICC). A variety of information is stored in the USIM such as subscriber information, as well as the keys and algorithms used for authentication with the network operator in order to obtain wireless network services.

Generally, UICCs are programmed with a USIM prior to subscriber distribution; the pre-programming or "personalization" is specific to each network operator. For example, before deployment, the USIM is associated with an International Mobile Subscriber Identity (IMSI), a unique Integrated Circuit Card Identifier (ICC-ID) and a specific authentication key (K). The network operator stores the association in a registry contained within the network's Authentication Center (AuC). After personalization, the UICC can be distributed to subscribers.

Figure 1:
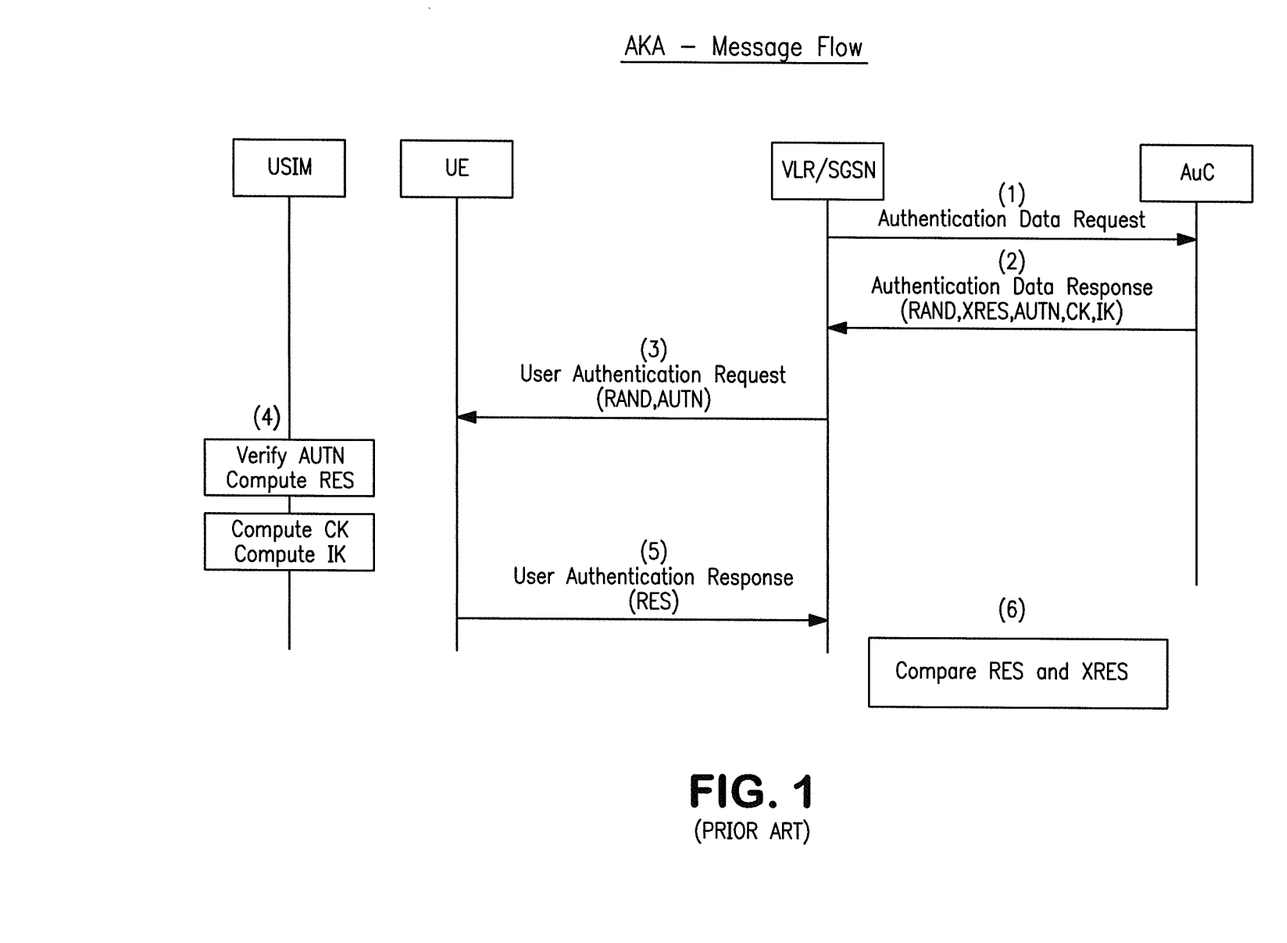
FIG. 1 illustrates an exemplary Authentication and Key Agreement (AKA) procedure using a prior art Universal Subscriber Identity Module (USIM).

Referring now to FIG. 1, one exemplary Authentication and Key Agreement (AKA) procedure 100 using the aforementioned prior art USIM is illustrated in detail. During normal authentication procedures, the UE 102 acquires the International Mobile Subscriber Identifier (IMSI) from the USIM 104. The UE passes it to the Serving Network (SN) 106 of the network operator or the visited core network. The SN forwards the authentication request to the AuC of the Home Network (HN). The HN compares the received IMSI with the AuC's registry and obtains the appropriate K. The HN generates a random number (RAND) and signs it with K using an algorithm to create the expected response (XRES). The HN further generates a Cipher Key (CK) and an Integrity Key (IK) for use in cipher and integrity protection as well as an Authentication Token (AUTN) using various algorithms. The HN sends an authentication vector, consisting of the RAND, XRES, CK, and AUTN to the SN. The SN stores the authentication vector only for use in a one-time authentication process. The SN passes the RAND and AUTN to the UE.

Once the UE 102 receives the RAND and AUTN, the USIM 104 verifies if the received AUTN is valid. If so, the UE uses the received RAND to compute its own response (RES) using the stored K and the same algorithm that generated the XRES. The UE passes the RES back to the SN. The SN 106 compares the XRES to the received RES and if they match, the SN authorizes the UE to use the operator's wireless network services.

Example Operation

Various aspects of the present invention are now discussed with respect to one exemplary implementation. In the context of the exemplary embodiment of the present invention, instead of using a physical UICC as in the prior art, the UICC is emulated as a virtual or electronic entity such as e.g., a software application, hereafter referred to as an Electronic Universal Integrated Circuit Card (eUICC), that is contained within a secure element (e.g., secure microprocessor or storage device) in the UE. The eUICC is capable of storing and managing multiple SIM elements, referred hereafter as Electronic Subscriber Identity Modules (eSIM). Each eSIM is a software emulation of a typical USIM, and contains analogous programming and user data associated therewith. The eUICC selects an eSIM based upon the eSIM's ICC-ID. Once the eUICC selects the desired eSIM (s), the UE can initiate an authentication procedure to obtain wireless network services from the eSIM's corresponding network operator.

Furthermore, as used hereinafter the term "subscriber access data" generally refers to access control client software, network specific access data, and/or user specific access data, etc. For example, in one exemplary embodiment of the present invention, subscriber access data generally refers to an eSIM logical entity, associated network personalization data, and dynamic data (e.g., user profiles, etc.).

Dynamic data relates to personalized data which is changed and/or created on the access control client after initial personalization (discussed hereinafter). In other words, the access control client is personalized to a specific network, subscriber and/or device. The personalized access control client is then provided along with the dynamic data to the device. One common example of dynamic data is eUICC/eSIM state after over-the-air-service provisioning (OTASP). For example, a MNO performs OTASP to add new types of services to a subscriber's device by using the communication network, instead of requiring the subscriber to physically bring the device in for reprogramming. After performing OTASP, the MNO tracks the eUICC state for the UE (e.g., such as by ICC-ID). The tracked eUICC state migrates as part of the dynamic data.

Another common example of dynamic data is user created data (e.g., phonebook information, etc.). Myriad other types of dynamic data compatible with the invention will be recognized by those of ordinary skill when given the present disclosure.

The following discussion describes methods and apparatus for flexibly assigning an access control client to a device at one or multiple times throughout the device's lifecycle. In one embodiment, a SIM Provisioning Server (SPS) can generate or assign an eSIM associated with one or more user accounts and one or more networks, and thereafter associate the eSIM with the eUICC of the device.

Figure 2:
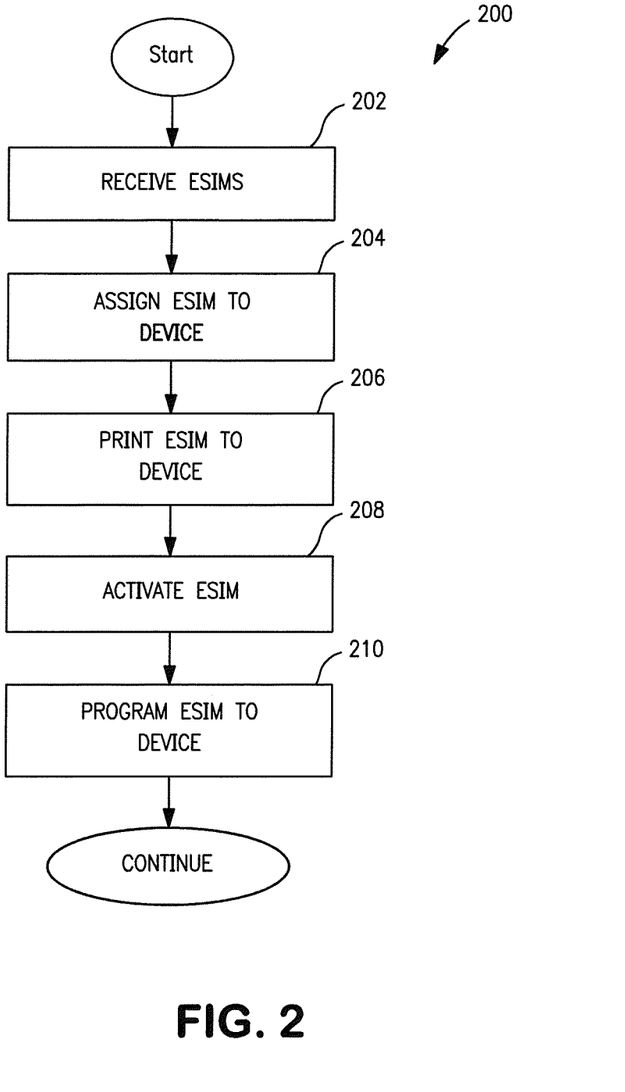
FIG. 2 is a logical flow diagram illustrating one embodiment of a method for assigning a device an electronic SIM (eSIM) according to the invention.

FIG. 2 illustrates one exemplary embodiment of the method 200 for assigning a device an eSIM. In this embodiment, a device is manufactured with a unique identifier (e.g., a serial number, MAC address, etc.) The serial or other number is associated with manufacturing information specific to the device. At step 202, a distribution center requests one or more eSIMs from an SPS. Included with the request is the unique identifier, and one or more prospective carriers/networks for the device (e.g., AT&T™, Verizon™, Sprint™). In some cases, the distribution center may have a pool of eSIMs suitable for assignment, or predesignated eSIMs for certain carriers. Various other schemes are described in greater detail subsequently herein.

At step 204, the distribution center assigns one or more eSIMs to the device. The assigned eSIM(s) is/are now "reserved" for that device. Then, at step 206, the eSIM(s) is/are rendered (e.g., printed on either the packaging materials of the device, such as on a sticker on the device box, such as using a bar code of the type well known in the computer arts), or the device itself, or otherwise disposed on a medium that is unique or specific to the device. The eSIMs may also be disposed so that they are made accessible via an electronic means (e.g., network), such as by entering the proper device serial number after authenticating the possessor of the device to the network).

Thereafter, the device eSIM can be scanned, or otherwise manipulated. For example, the device eSIM can be quickly determined by Point of Sale (POS) personnel without activating the device. It is of particular note that the foregoing steps can assign an eSIM to a device without the device powering on, or requiring external interface (i.e., the process can be executed while the device is in transit to POS location, etc.)

Once the device is at the Point of Sale (POS) location, a new subscriber can purchase the device. At step 208, the device eSIM is associated with the user account at the SPS (either at the POS, at the purchaser's home, etc.) For example, the device can be purchased and activated in a retail store associated with a particular MNO or carrier, with the assistance of an MNO representative. Alternately, the user can purchase the device directly from the device manufacturer e.g., from an online store, etc., and self-activate.

At step 210 of the method 200, the device is programmed with the finalized eSIM. For example, once the subscriber takes the device home, the initialization process of the device can retrieve the eSIM information when the device is first powered on, or by the user accessing a prescribed function within the device.

The process of FIG. 2 has several salient advantages. Firstly, unlike prior art solutions which request a SIM when the subscriber purchases a SIM card, the foregoing exemplary embodiment postpones various portions of the eSIM association until each such portion is actually required. As described supra, various portions of eSIM association process include: (i) device association with the eSIM at the distribution center, (ii) user account association with the eSIM at the POS, and (iii) the device programming, such as just prior to use. Postponement in this fashion enables a wide variety of different business and operational models that are not possible, or are exceedingly difficult for prior art activation procedures. For example, using the foregoing methods of the invention, third-party retailers can sell devices, or users can order devices online, etc., and readily and rapidly enable their devices at their time and place of choosing.

Moreover, in addition to postponement of device-eSIM association, the devices can be manufactured as so-called "SIM-in" devices, without actually including a physical SIM. Since the assignment of an eSIM to the device is performed by e.g., printing a label and attaching it to the device, the same manufacturing processes can be used to manufacture devices for multiple networks. The device may be either programmed with an eSIM e.g., by a device vendor, customer, etc. (based on its identifier), or alternately, the device can automatically download an appropriate eSIM using its identifier.

Secondly, since the eSIM does not need to be activated until all portions of the eSIM are known, the process can be prematurely aborted. For example, at step 204, a mobile device may come primed with three (3) eSIMs for three (3) different networks; after the device purchaser selects one (1) network (step 210), the other two (2) eSIMs can be returned unused if desired. Thereafter, the device is programmed with the final eSIM at step 210.

Thirdly, the foregoing method 200 may be implemented to reduce real-time traffic on an eSIM vendor's Information Technology (IT) infrastructure by pre-personalizing eSIMs before devices ask for the access data, and caching it "on the cloud" (e.g., at the SPS). Accordingly, the eSIM vendor's IT system can generate a large pool of "bulk" eSIMs and provide these eSIMs to an SPS during lulls (e.g., at night) or in anticipation of sudden large-scale demand (e.g., new product launches). Moreover, an SPS that has previously cached an array of eSIMs can provision the eSIM assigned to the identifier, even where the eSIM vendor IT system is not available. Hence, "crashes" at the provisioning system (which can lead to extreme user disappointment and loss of experience) can be avoided or at very least mitigated.

Still further, generic or unpersonalized eSIMs can be handled as a fungible commodity for purposes of management, distribution, etc.

Exemplary eSIM Management Network Architecture

Figure 3:
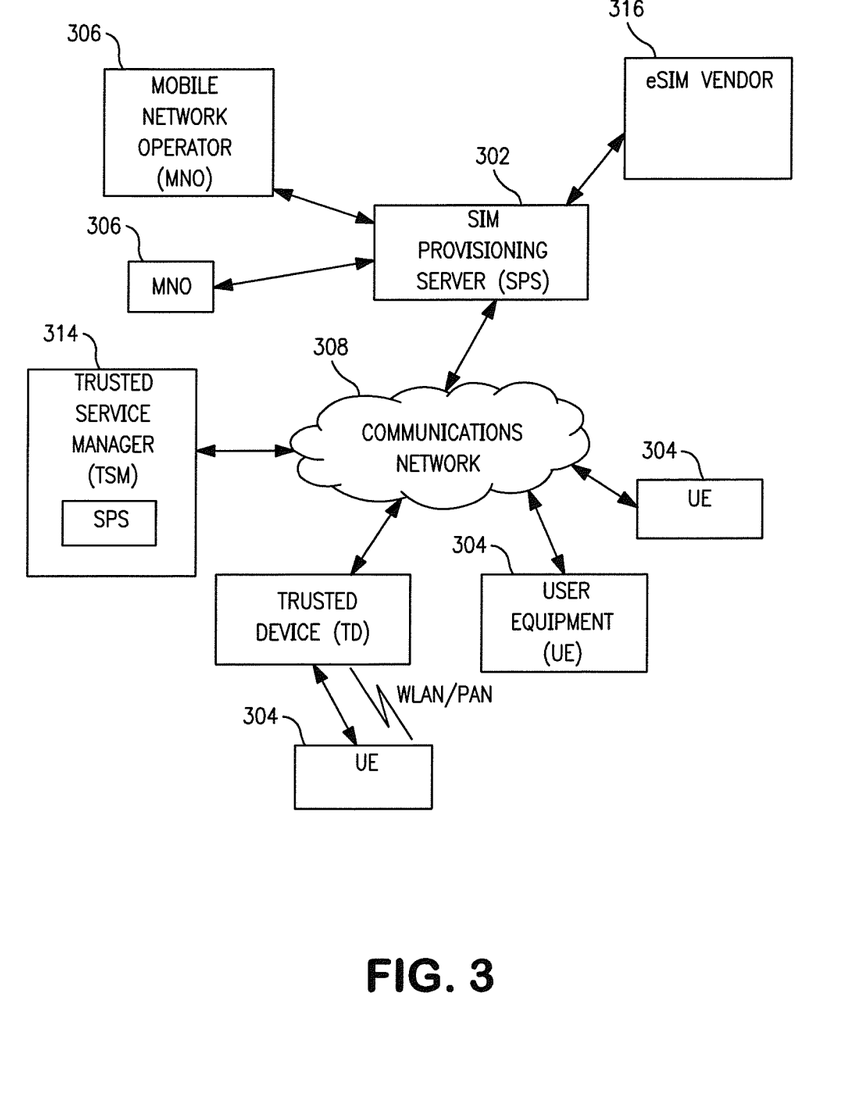
FIG. 3 is a block diagram illustrating one embodiment of an electronic subscriber identity module (eSIM) management network architecture according to the invention.

Referring now to FIG. 3, one embodiment of an electronic subscriber identity module (eSIM) management network architecture according to the present invention is illustrated. As shown, the network architecture generally includes a SIM provisioning server (SPS) 302 configured to communicate with a plurality of user equipment (UE) 304 over a communications network 308. The SPS is further in communication with a plurality of mobile network operators (MNOs) 306. A description of the foregoing entities is now presented.

The SPS 302 in the embodiment of FIG. 3 is a stand-alone entity managed by a service intermediary. In one implementation, the service intermediary may comprise a device manufacturer (such as e.g., the Assignee hereof, Apple Inc.™) partnered to one or more MNOs 306, although other arrangements may be used with equal success. The SPS is responsible for storing a plurality of available eSIMs which are provided to and utilized by UE 304 in the network 308. The SPS may receive a "pool" of eSIMs from an eSIM vendor 316, or alternatively, may generate the eSIMs itself. Each eSIM is pre-programmed or "personalized" based on the applicable network operator via the SPS.

As also shown, a SPS may also be embodied within a Trusted Service Manager (TSM) 314; common examples of TSMs include third-party SIM vendors, SIM resellers, etc. The TSM has a pre-established trust relationship with one or more MNOs. Accordingly, access to MNOs 306 may be provided via the combination of the standalone SPS and/or TSMs (and associated SPS). In other words, the standalone SPS may be utilized for providing services and eSIMs to UEs on certain networks, while the TSM is utilized for providing services and eSIMs to UEs on other networks associated with the TSM. Various other schemes will be recognized by those of ordinary skill as well when provided this disclosure.

The MNOs 306 comprise wireless or mobile carriers and service providers. Exemplary MNOs typically provide telephony, short message service (SMS) text, and data services to a group of subscribers via a communications network. Examples of MNOs include e.g., AT&T™, Verizon™, Sprint™, etc., as well as WLAN or WMAN service providers.

The communications network 308 may be any network which enables the provision of the above-described services. For example, the communications network 308 may comprise a wired or wireless communications or data network. Common examples of a wireless network include cellular networks such as: Global System for Mobile Communications (GSM), General Packet Radio Service (GPRS), Enhanced Data rates for GSM Evolution (EDGE), Universal Mobile Telecommunications System (UMTS), Long Term Evolution (LTE), LTE-Advanced (LTE-A), or other network (e.g., CDMA2000, mobile WiMAX networks, WLAN networks, etc.). Millimeter wave or satellite systems may also be used. Common examples of a wired network include the Internet, intranets, etc.

As described in greater detail hereinafter, the type of network may be specific to the mode of eSIM provisioning. For example, a device may be purchased and activated in a retail store with the assistance of an MNO representative, the communication network may be an internal network to an SPS server, or TSM SIM vendor. In another case, the device may be purchased and activated in the comfort of the purchaser's home; the purchaser connects to an online store to activate the device (the online store being in communication with an SPS or TSM). In yet another example, the device is purchased and activated over-the-air; for example, the device may initially connect to a, SPS to purchase an eSIM, before attempting connection to the network (as described in U.S. provisional patent application Ser. No. 61/407,862 filed on Oct. 28, 2010 and entitled "METHODS AND APPARATUS FOR DELIVERING ELECTRONIC IDENTIFICATION COMPONENTS OVER A WIRELESS NETWORK", previously incorporated by reference herein). The foregoing distinct modes of provisioning eSIMs are provided merely to illustrate the flexibility of SPS operation, and various communication networks useful therewith. Other variants are described in greater detail hereinafter.

Moreover, the architecture of FIG. 3 may be used as discussed above to provide for the provisioning of multiple eSIM for a particular subscriber, group of subscribers (e.g., family, enterprise, etc.), and/or device. The above-disclosed architecture may likewise be utilized to provide mechanisms for the UE 304 to switch, add, remove, modify, etc. eSIMs quickly and effectively, such as for managing different uses or contexts on different eSIMs (e.g., personal, business, travel, mobile versus static, etc.).

Methodology

Figure 4:
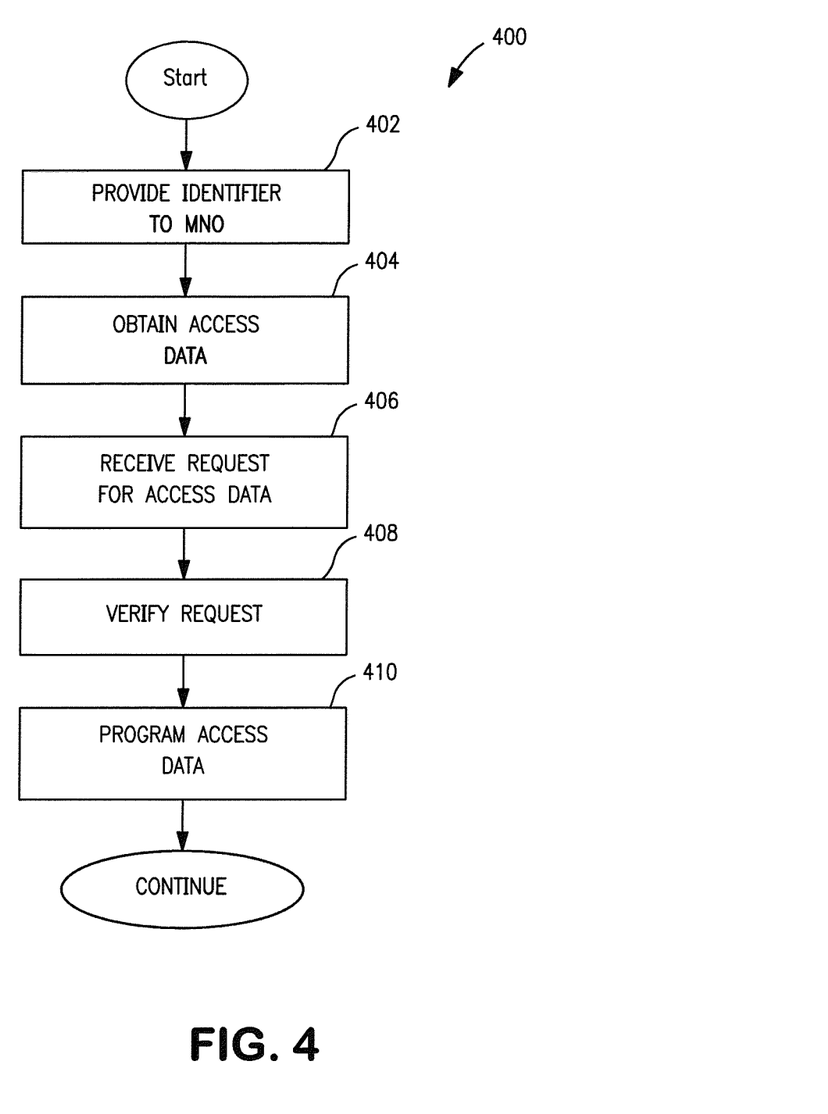
FIG. 4 is a logical flow diagram illustrating one embodiment of a generalized method for provisioning access data order to activate a device according to the invention.

Referring now to FIG. 4, one embodiment of a generalized method 400 for provisioning access data order to activate a device is illustrated and described. This embodiment may be used e.g., to activate user equipment at a retail store, with the assistance of an MNO representative, or in other activation scenarios as described above.

As shown, per step 402, an identifier is provided to a network carrier database. In one exemplary embodiment, the device identifier may comprise an ICC-ID; yet other common examples of unique identifiers include serial numbers, device specific identifiers, device hardware identifiers (e.g., MAC addresses), etc. In one such example, a phone is manufactured with an identifier (e.g., a ICC-ID, serial number, etc.); the identifier can be provided to one or more MNO carriers (e.g., AT&T™, Verizon™, Sprint™) by the manufacturer or a distributor. Generally, the MNO further provides the identifier to the SIM manufacturer, who generates and controls the relationships between the identifiers and eSIMs. It is appreciated that various other arrangements may be used in other systems and business models (e.g., such as where the network carrier generates the device identifiers, the device manufacturer generates the device identifiers)

For example, a device manufacturer may manufacture a large number of devices, and provide the ICC-IDs to the MNO, and then ship the devices to prospective consumers or retail stores. In some cases, the ICC-ID may be printed or otherwise indicated on the device or the device packaging, or made accessible via electronic means (e.g., RFID, etc.), such that any recipient can determine the unique identifier without powering on the device. In one such variant, the device displays an ICC-ID as a bar code that can be scanned by a sales agent or equivalent. In a further variant, the "scan" may be automatic upon connection or other communication between the device and an appropriately equipped apparatus (e.g., a software client running on a home computer, an RFID scanner of a stockroom, etc.) In yet other variants, the identifier may be human readable, and read by a user and input into a graphical user interface (GUI) of the device, or an activation terminal.

In an alternate implementation, a previously manufactured device has a unique identifier associated therewith (e.g., printed on the device, retrieved from memory, etc.). In one example, an owner of a device terminates the existing service, and provides the unique identifier to a new MNO to procure a new service contract. In yet another example, a person may purchase an unlocked or pre-paid phone, and thereafter request a new service contract.

In preparation, the MNO may also pre-establish a subscriber "skeleton" account or template for the device identifier; the skeleton account requires additional details to complete the account (e.g., at this point, the skeleton account does not have user account information, eSIM information, etc., but rather merely the framework for such details).

Next, at step 404, access data is generated or obtained for the unique identifier. In one exemplary embodiment, a SPS generates or allocates an eSIM associated with a particular MNO. In alternative embodiments, a third-party SPS can generate or allocate an eSIM for a particular MNO. Access data generation refers in the present context to the origination of entirely new access data. In contrast, access data allocation refers in the present context to allocation of access data from a pre-generated pool of access data. For example, an SPS may have the capabilities to generate eSIMs for use with an MNO, or in other cases, an SPS may have a pool of eSIMs which it can allocate and deallocate.

The access data is associated with the unique identifier. In one exemplary embodiment, the SPS associates an eSIM with the unique identifier as well as any pertinent information regarding the particular MNO.

In one variant, several access data may be generated or allocated for the same unique identifier. For example, in one distribution scheme, a customer may have several options for MNO's. Since it is unknown which MNO a customer will eventually subscribe with, each device may have multiple eSIMs and corresponding ICC-IDs associated therewith, where each eSIM is associated with a corresponding one of the MNOs.

The access control client may also be optionally "personalized" at step 404. As discussed above, in one embodiment, the access control client is personalized or pre-programmed with information that is specific to a particular network operator or service provider. For example, the eSIM may be programmed with information specific to the MNO.

Furthermore, in one embodiment, the access control client is personalized to include dynamic data including subscriber and/or device specific data. For example, where the access control client is obtained for an existing customer, there may be subscriber-specific or device-specific data that can be personalized to the access control client. In one such implementation, a person requesting a new service contract may have existing personalization information that can be migrated from their previous eSIM profile (e.g., phonebook, etc.)

At the conclusion of step 404, the SPS has reserved an access control client for the device identifier; the account is then ready for the final user account specific information (if necessary).

At step 406, a request is made to tie a user account to the access data corresponding to the unique identifier of the device. For instance, in one exemplary embodiment, when a customer purchases a device from a retail store operated by an MNO, then the user (or sales representative) requests the eSIM associated to the ICC-ID printed on the device. In an alternate example, when a customer receives a device from an online store, then requests the eSIM associated with the ICC-ID printed on the device (or the device's packaging), such as via the Internet or telephone.

The request may include the unique identifier associated with the device's unique identifier, and any further information necessary to retrieve the reserved access control client. In at least one variant, the request additionally comprises a specific MNO selection.

In yet other embodiments, steps 404 and 406 are reversed; i.e., the user data is requested for a user account first, and subsequently thereafter the user data obtained for storage to the device. For example, in one distribution scheme, a group of subscribers is assigned a pool of eSIMs (e.g., a family plan, a corporate account, etc.). Each subscriber is assigned a specific eSIM. When a subscriber receives a device (such as in the mail, at the store, etc.), the device is programmed with the appropriate eSIM corresponding to the user.

In other variants, the request includes one or more user information specific to the requesting user. For example, common user information may include any of user identity (e.g., social security number, driver's license number, etc.), user account information (e.g., a credit card account number, bank account number, routing number, etc.), etc.

In one embodiment, the request is sent from a trusted entity with which the device is in communication. Common examples of trusted entities may include a point of sale or network-based device or other equipment maintained and/or managed by a MNO. Alternatively, the request may be sent directly from the device requesting the access data.

The association of user account to unique identifier to eSIM can advantageously be performed according to multiple different distribution models. Thus, the following presents exemplary alternate embodiments for associating user account information to access data.

Access Control Module

In one such embodiment, the request is made from an access control module that is pre-installed on the device prior to distribution to a user. For example, the access control module may enable secure connection to the MNO, without an existing access control client, as described in greater detail in U.S. provisional patent application Ser. No. 61/407,866 filed on Oct. 28, 2010 and entitled "METHODS AND APPARATUS FOR STORAGE AND EXECUTION OF ACCESS CONTROL CLIENTS". Such pre-installed access control modules may be particularly helpful where a MNO does not provide a physical store or virtual storefront; e.g., Internet sales, etc. Once a customer powers on the mobile device, the device connects to an SPS. In one variant, the access module enables the device to roam to any available network operator (with valid roaming agreements) and connect to a valid SPS in this manner.

The access control module on the mobile device requests access data. In one variant, the access control module is pre-programmed with a list of MNOs to which the device can preferentially request from; e.g., MNOs with a corresponding eSIM to the device's ICC-ID. In alternate variants, the access control module determines the available MNOs, and optionally determines their suitability for operation, and requests allocation of an eSIM. The determination of suitability, if used, can be made according to any number of criteria such as PHY or device compatability, signal strength (e.g., using indigenous radio equipment within the mobile device receiver to measure RSSI, CIR, or other RF parameters), cost structure or other financial considerations, and so forth.

In the instance the user selects a MNO which does not have a reserved eSIM, a new account must be established with that MNO. New account generation includes, inter alia, providing the MNO with information regarding the device and the subscriber, and providing at least a mechanism for ensuring reliability of the data provided thereto. This may be performed for example by the SPS in conjunction with other network entities including e.g., billing entities, management entities, etc.

Client/Server

In yet another alternate embodiment, the device connects to a server to request user account information. That is to say, the mobile device, once purchased, is useful only for accessing a limited access client server via e.g., the Internet or other communication medium. Mechanisms such as the aforementioned access data module running on the mobile device may be employed to ensure that the mobile device may not be used for other purposes upon start-up, except and until access to an MNO network is granted.

The client server receives a selection of an MNO from the user. In one implementation the user may be provided with pre-determined ones of available MNOs in the form of a list or menu from which the user must select. According to this implementation, the previously discussed pre-establishment of partial or "skeleton" accounts based on the entry of an ICC-ID or other identifier at particular ones of the MNOs may be utilized.

In another variant, the pre-determined list of available MNOs may be based on a business relationship held between the selected MNO and the device manufacturer and/or entity that manages the client server. Alternatively, the user may be provided with an opportunity to select from among all possible MNO; i.e., the selection is not limited in any way.

Referring back to FIG. 4, per step 408, the request is verified, and if successful the access data is associated with the user account. In one exemplary embodiment, the MNO database determines whether the unique device identifier is among those previously provided thereto. If the device identifier is listed in the database, a message or other communication is provided to the SPS indicating that the access data may be provided in response to the request. If the device is not listed in the database, then the MNO denies service to the device, and an error message may be provided. For example, the MNO may indicate that the ICC-ID is incorrect, and/or the device itself is faulty.

In one such variant, the MNO additionally determines if the user account information is acceptable. For example, the MNO may additionally perform credit checks, etc. Alternatively, it is appreciated that, in response to the message from the MNO, the user may optionally provide additional information needed to finalize the account.

In one exemplary embodiment, the request is processed, and portions thereof are provided to a selected MNO (of a plurality of possible MNOs). The remaining (i.e., not selected) MNOs are informed that they can deallocate the reserved eSIMs. Thereafter, only one ICC-ID is associated with the appropriate eSIM. Reclamation is described in greater detail hereinafter (see Reclamation and Returns)

Thereafter, the user and the MNO have implicitly agreed to a user account that is accessible with an eSIM. In some embodiments, further establishment of an account may include providing information to the MNO regarding the device and the subscriber.

The device may then be activated by programming the access data onto the device (step 410). In one exemplary embodiment, the access data comprises an eSIM, and any further aforementioned dynamic data.

It is appreciated that while the methods described above utilize a "request/response" model, the methods may also be configured to operate using a "push" model, whereby a network device (such as e.g., the SPS) initiates a transfer of an eSIM, etc. without receiving an explicit request, for example, upon connection of the UE to the network, to the SPS, etc. This might also occur where it is detected that a UE is without an active eSIM for a predetermined length of time, or under other circumstances or schemes (e.g., polling of client devices at a prescribed periodicity or in an event-driven manner).

In another aspect of the invention, additional computer programs disposed on e.g., the SPS, the client server, the UE or other location are utilized to invoke operational rules thereon. The operational rules are used to achieve one or more goals relating to operations or business (e.g., profit) including; for instance, network optimization and reliability goals, increased maintenance intervals, increased subscriber or user satisfaction, increased subscription base, higher profit, and so forth.

For example, in one embodiment of the present invention, various logical rules for controlling access to or distribution of eSIM, dynamic data, or other access control client as discussed herein (and in some cases the operation of e.g., the SPS, and/or the UE) are employed. The rules may comprise a separate entity or process, or may be fully integrated within other processing entities such as the provisioning application and/or the access data module (discussed below).

It is appreciated that the distribution and use of access control clients (e.g., eSIM) may occur according to certain operational protocols or decision processes (as discussed above), actual or projected conditions existing within the network, etc. For example, in the embodiments discussed above, a particular eSIM is provided to a requesting device, provided that the device is authorized to access the eSIM. However, this decision processes may not always be consistent with higher-level business or operational goals, such as reducing latency, or maximizing profit or system reliability. Hence, when imposed, the business/operational rules can be used to dynamically (or manually) control the distribution and/or use of access control client across multiple devices.

One rule implemented may comprise enabling the transfer and/or use of an eSIM to a particular UE according to a subscriber class. In other words, certain eSIM are associated to higher-tier services, and thus may only be permitted to be transmitted to a limited number of devices and/or types of devices.

Similarly, a requested eSIM may be controlled so that it is only transmitted to only subscribers and/or devices meeting certain criteria. For example, if the requesting device does not possess requisite functionality to use an eSIM having upgraded functionality, it may be denied access to that eSIM. Alternative eSIM meeting the device or subscriber limitations may be provided at the denial of access.

Business rules may also be implemented, such as for generating revenue for an eSIM distributor. In particular, as noted above, the SPS may be managed by a service intermediary. The service intermediary may comprise for instance a device manufacturer partnered to one or more MNOs. The service intermediary may (alongside the selected MNO), command a premium for access to the eSIM distributed from the SPS. Pricing structures may be derived according to any number of different schemes; e.g., based on subscriber levels, levels of services provided, etc.

Still further, it is appreciated that the client server may be managed by the aforementioned service intermediary (such as a device manufacturer) and provide mechanisms and business rules for eSIM access. In one embodiment, a user may purchase the UE, then via the Internet or other network, request post- or pre-paid access to eSIM. The service intermediary performs many of the functions of an MNO (such as by managing billing, etc.) according to this embodiment.

Yet other capabilities and features enabled by the various aspects of the present invention are discussed infra.

Security

Since access control clients comprise sensitive data, it may be advisable to control the distribution of the access control client. Common solutions for security include key encryption, cryptography, cryptographic hashes, etc. For example, as described in U.S. provisional patent application Ser. No. 61/407,866 filed on Oct. 28, 2010 and entitled "METHODS AND APPARATUS FOR STORAGE AND EXECUTION OF ACCESS CONTROL CLIENTS", previously incorporated by reference herein), cryptographic measures can ensure secure exchange of sensitive access control client information and data over unsecure transmission media. Security measures are necessary to ensure proper delivery, especially where the network is untrusted (e.g., over a public Internet, home computer, etc.)

The aforementioned methods of FIG. 4 may further incorporate mechanisms for verifying the identity requests and messages at the entity receiving these (e.g., SPS, MNO, client server, and/or UE). For example, the entity may determine the authenticity of the source of the request or message (i.e., ensure that the entity which sent the request is authorized to do so, and/or is on behalf of a device which is authentic), based on a secure certificate, challenge-response, etc.

In a further variant, verification of authenticity may require successful response to a known cryptographic challenge (e.g., key cryptography or one-way hash).

Reclamation and Returns

As previously described, once the appropriate access data has been provided to the client, the SPS may optionally take steps to reclaim the unused access data which were pre-established to link the device to other MNO networks. In other words, in the above-described embodiment where multiple eSIM are stored at the SPS (each linking a particular device to more than one MNO), once an MNO is selected and an account established for the device, the other linked eSIMs may be returned to a pool of available eSIM. This feature is useful for example where each MNO has only a limited pool of eSIMs, and many subscribers or users requesting them. It is noted, however, that in other implementations, the pre-established eSIMs given to a device may be retained by that device, such as according to one or more retention criteria (e.g., for a finite period of time, until the occurrence of an event, or indefinitely), so as to enable possible subsequent selection fo another MNO's eSIM for that device. Such "switching" might occur for example where the user tries one MNO's eSIM for a while, and then decides they are not happy with the service, etc.

The network can use existing records of eSIM usage to reclaim unused eSIM. Suppose for example, a sales representative or user selects the wrong eSIM or MNO from a provided list or otherwise needs to return an eSIM which was incorrectly or inappropriately provided (such as where a device ID is incorrectly entered or provided). In this instance, a process for returning the eSIM back to the network (e.g., the SPS AB) is needed; however, it is appreciated that such a return may introduce "burnt" eSIM, i.e., those which are linked to a particular ICC-ID, into the pool depending on when the return is initiated relative to the attempt to activate on the carrier system. Accordingly, in one embodiment of the invention, "returned" eSIMs are not automatically put back into the pool when received from eUICC, but are instead sent to an outside entity which utilizes MNO integration, to vet whether returned eSIMs are reusable or not. Those which are still reusable are sent back to the SPS to be moved into the free pool. This vetting process can also be batched if desired.

SIM Provisioning Server (SPS)

Figure 5:
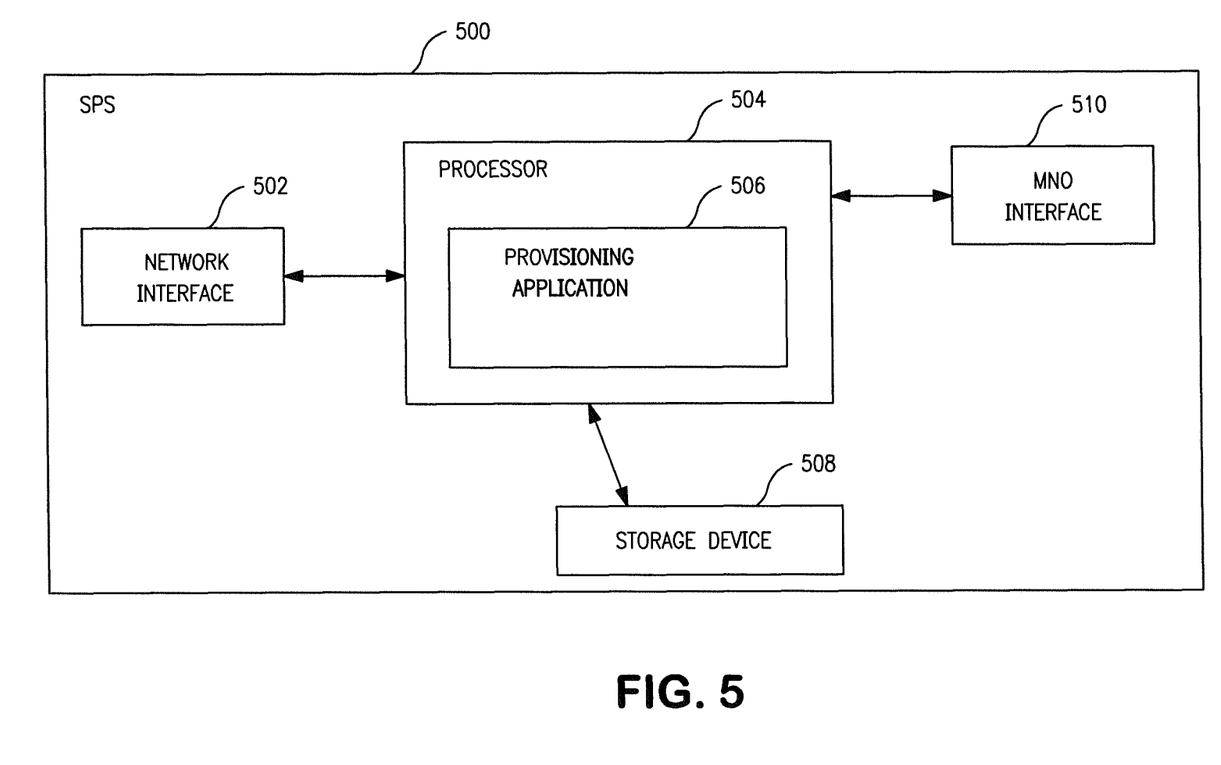
FIG. 5 is a block diagram of an exemplary embodiment of an SIM (Subscriber Identity Module) provisioning server (SPS) apparatus according to the invention.

FIG. 5 illustrates one exemplary embodiment of an SPS 500 according to the present invention. As discussed above, the SPS may comprise a stand-alone entity, or may be disposed within a TSM or other system, or assume yet other configurations. As shown, the SPS generally includes a network interface 502 for interfacing with a communications network, a processor 504, a storage apparatus 508, and various back end interfaces. Although an MNO interface 510 is illustrated, it is appreciated either or both of these may be omitted, replaced, or duplicated. Other interfaces may also be utilized, the foregoing being merely illustrative. The MNO interface enables the SPS to communicate with one or more MNOs.

In the illustrated embodiment, the SPS 500 includes at least a provisioning application 506 running on the processor 504 thereof. Although illustrated as a single application running on the SPS, it is appreciated that the foregoing provisioning functionality may comprise a distributed application running on a plurality of entities in data communication with one another.

The provisioning application 506 receives communications from mobile devices, other trusted devices, client servers, etc., such as a communication requesting access to one or more eSIM stored thereon. The provisioning application 506 is also responsible for verifying the above requests to ensure these are received from authorized entities, and there are no security concerns.

The provisioning application 506 may be further configured to store a database of available eSIMs. The database may provide information relating to the device and to each MNO associated to a particular eSIM. Additional information may be maintained as well. In one embodiment, the provisioning application 506 generates and stores the eSIM as well as the database. Alternatively, these may be generated elsewhere and merely received and stored at the SPS. Likewise, the provisioning application 506 may be used to update or change information stored in the database.

The database, as well as the provisioning application 506 itself, may be stored at e.g., the storage entity 508 associated with the SPS.

When a user or device requests an eSIM from the SPS, the provisioning application 506 is responsible for parsing the request and using information therein to provide at least a device identifier (e.g., ICC-ID) to an MNO.

Still further, the provisioning application 506 may be used to generate a list of available MNO specific to each device in communication therewith. In one embodiment, this is accomplished based on agreements between a device manufacturer and the MNO.

Lastly, the provisioning application 506 may optionally generate notifications to an MNO representative or the user in the instance access data (e.g., eSIM) cannot be provided thereto, and/or access is denied.

Mobile Device

Figure 6:
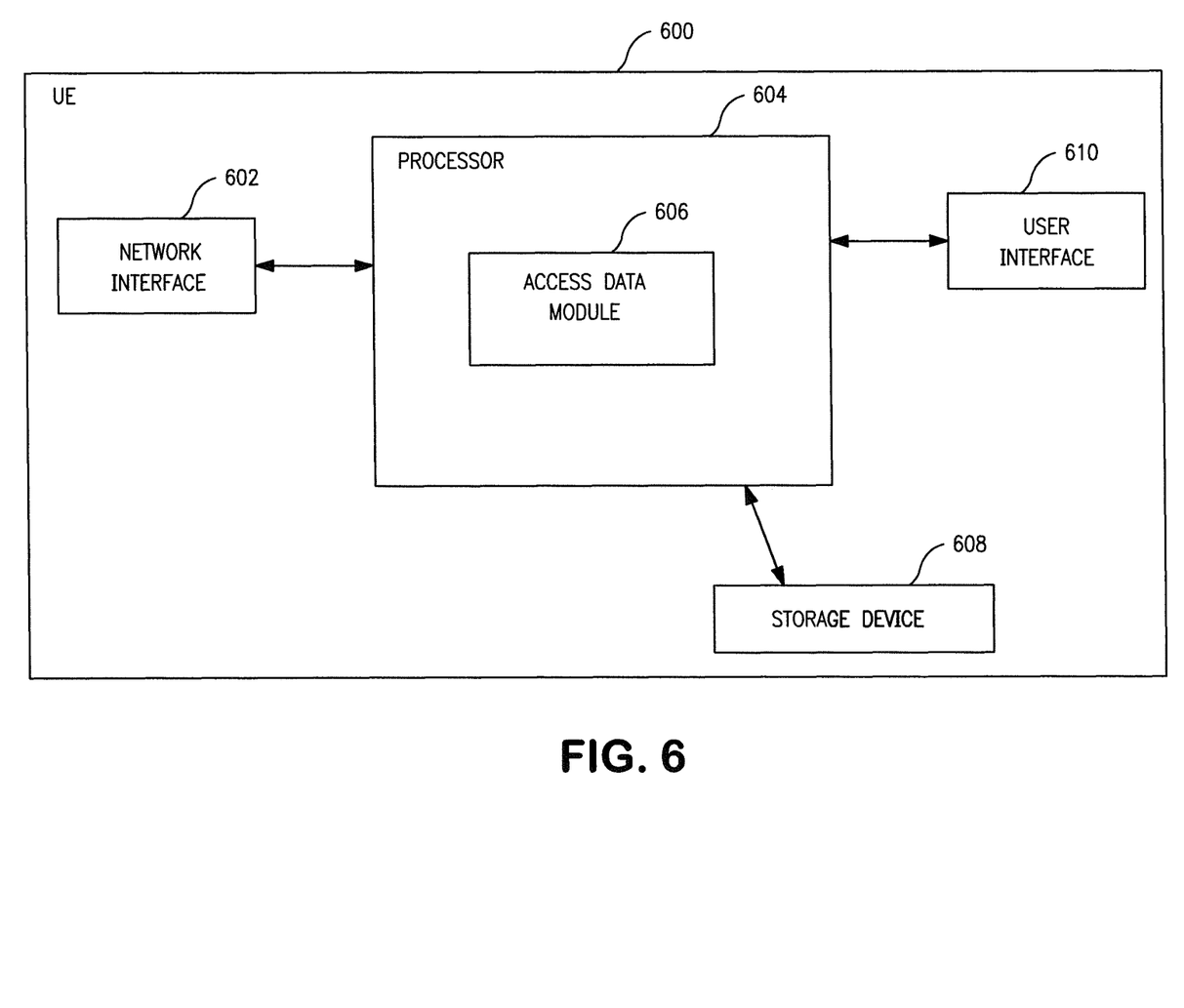
FIG. 6 is a block diagram illustrating an exemplary embodiment of a user device according to the invention.

FIG. 6 is a block diagram illustrating an exemplary user device 600 for use in providing the access data provisioning features discussed herein. As discussed above, the mobile device comprises, e.g., a mobile smartphone, mobile handheld computer, or the like, which receives access data from another device in the network, such as an SPS 500, or a client server.

As illustrated, the exemplary user device (e.g., a UMTS UE) 600 of FIG. 6 includes a network interface 602 for communication with the communication network (and entities thereof including the SPS). The UE 600 may also communicate with client servers via the network interface 602. In one embodiment, the UE requests and receives eSIMs via this interface. The UE further includes a digital processor 604 and associated storage 608. The digital processor 604 is configured to run various applications thereon. A user interface 610 (e.g., GUI) is also illustrated. In one embodiment, the user interface 610 comprises a touch-screen interface (e.g., "multi-touch" interface) for enabling the user to communicate with the UE and vice versa. For example, the user interface may be used to display messages and provide services to the user, and receive user selections for e.g., MNO/service plan selection. Alternative interfaces may also be utilized.

The processor 604 is configured to run an access data module 606 thereon. The access data module 606 is, in one embodiment, responsible for causing the device to immediately connect to a SPS when the device is turned on. It is via the access data module 606 that the device is able to roam onto a networks to access the SPS. The access data module 606 may further be employed to ensure that the UE is not used for other purposes upon start-up, except and until the authentication and account set-up processes discussed above are completed, and access to an MNO network is granted.

The storage device 608 of the UE may be configured to store one or more access control clients thereon, including the above referenced dynamic data. The storage device 608 may further store the above-described access data module 606 which is run on the processor 604. The storage device 608 may comprise for example a random access memory (RAM), a hard disk drive, an optical drive (e.g., CD-ROM or DVD), NAND/NOR flash memory, or some combination thereof.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A wireless device, comprising:
   at least one wireless interface configured to communicate with at least one wireless network;
   a secure element that manages at least a first electronic Subscriber Identity Module (eSIM) that represents a virtualization of a physical SIM card;
   a processor configured to cause the wireless device to:
      issue, to an eSIM provisioning server, a request to retrieve a second eSIM that is different from the first eSIM managed by the secure element, wherein the request includes an identifier associated with the second eSIM;
      receive the second eSIM from the eSIM provisioning server;
      store the second eSIM in the secure element;
      use the second eSIM, in conjunction with the at least one wireless interface, to access services provided by a Mobile Network Operator (MNO) that is associated with the at least one wireless network; and
      when a retention criteria associated with the first eSIM is satisfied:
         removing the first eSIM from the secure element, and
         providing the first eSIM to the eSIM provisioning server.

2. The wireless device of claim 1, wherein the identifier is a serial number specific to the wireless device.

3. The wireless device of claim 2, wherein the identifier is printed on the wireless device.

4. The wireless device of claim 2, wherein the identifier is stored in a memory included in the wireless device.

5. The wireless device of claim 2, wherein the identifier corresponds to an Integrated Circuit Card Identifier (ICC-ID) that is associated with the eSIM.

6. The wireless device of claim 1, wherein the eSIM provisioning server obtains the second eSIM from an eSIM vendor.

7. The wireless device of claim 6, wherein the eSIM provisioning server utilizes a Trusted Services Manager (TSM) to verify the second eSIM prior to providing the second eSIM to the wireless device.

8. A method for managing electronic Subscriber Identity Modules (eSIMs), the method comprising:
   at a wireless device:
      issuing, to an eSIM provisioning server, a request to retrieve a second eSIM that is different from a first eSIM managed by a secure element included in the wireless device, wherein the request includes an identifier associated with the second eSIM;
      receiving the second eSIM from the eSIM provisioning server;
      storing the second eSIM in the secure element;
      using the second eSIM, in conjunction with at least one wireless interface included in the wireless device, to access services provided by a Mobile Network Operator (MNO) that is associated with at least one wireless network; and
      when a retention criteria associated with the first eSIM is satisfied:
         removing the first eSIM from the secure element, and
         providing the first eSIM to the eSIM provisioning server.

9. The method of claim 8, wherein the identifier is a serial number specific to the wireless device.

10. The method of claim 9, wherein the identifier is printed on the wireless device.

11. The method of claim 9, wherein the identifier is stored in a memory included in the wireless device.

12. The method of claim 9, wherein the identifier corresponds to an Integrated Circuit Card Identifier (ICC-ID) that is associated with the eSIM.

13. The method of claim 8, wherein the eSIM provisioning server obtains the second eSIM from an eSIM vendor.

14. The method of claim 13, wherein the eSIM provisioning server utilizes a Trusted Services Manager (TSM) to verify the second eSIM prior to providing the second eSIM to the wireless device.

15. A non-transitory computer readable storage medium configured to store instructions that, when executed by a processor included in a wireless device, cause the wireless device to manage electronic Subscriber Identity Modules (eSIMs), by carrying out steps that include:
   issuing, to an eSIM provisioning server, a request to retrieve a second eSIM that is different from a first eSIM managed by a secure element included in the wireless device, wherein the request includes an identifier associated with the second eSIM;
   receiving the second eSIM from the eSIM provisioning server;

storing the second eSIM in the secure element;
using the second eSIM, in conjunction with at least one wireless interface included in the wireless device, to access services provided by a Mobile Network Operator (MNO) that is associated with at least one wireless network; and
when a retention criteria associated with the first eSIM is satisfied:
  removing the first eSIM from the secure element, and
  providing the first eSIM to the eSIM provisioning server.

16. The non-transitory computer readable storage medium of claim 15, wherein the identifier is a serial number specific to the wireless device.

17. The non-transitory computer readable storage medium of claim 16, wherein the identifier is printed on the wireless device.

18. The non-transitory computer readable storage medium of claim 16, wherein the identifier is stored in a memory included in the wireless device.

19. The non-transitory computer readable storage medium of claim 16, wherein the identifier corresponds to an Integrated Circuit Card Identifier (ICC-ID) that is associated with the eSIM.

20. The non-transitory computer readable storage medium of claim 15, wherein the eSIM provisioning server obtains the second eSIM from an eSIM vendor.

* * * * *